United States Patent [19]
Farrar

[11] Patent Number: 5,910,991
[45] Date of Patent: *Jun. 8, 1999

[54] METHOD AND APPARATUS FOR A SPEAKER FOR A PERSONAL COMPUTER FOR SELECTIVE USE AS A CONVENTIONAL SPEAKER OR AS A SUB-WOOFER

[75] Inventor: Douglas M. Farrar, Los Altos, Calif.

[73] Assignee: Apple Computer, Inc., Cupertino, Calif.

[ * ] Notice: This patent issued on a continued prosecution application filed under 37 CFR 1.53(d), and is subject to the twenty year patent term provisions of 35 U.S.C. 154(a)(2).

[21] Appl. No.: 08/692,031

[22] Filed: Aug. 2, 1996

[51] Int. Cl.[6] ................................................. H04R 29/00
[52] U.S. Cl. ............................... 381/59; 381/77; 381/120
[58] Field of Search .................................. 381/25, 74, 77, 381/81, 85, 100, 98, 99, 59, 58, 120; 330/207 P, 298

[56] References Cited

U.S. PATENT DOCUMENTS 4,583,245  4/1986  Gelow et al. ............................. 381/100
5,661,811  8/1997  Huemann et al. ......................... 381/25

*Primary Examiner*—Vivian Chang
*Attorney, Agent, or Firm*—Sawyer & Associates

[57] ABSTRACT

A high quality speaker for use with a personal computer is used in two modes, first as a conventional, multi-function speaker for conventional computer audio output and second as a sub-woofer for use in combination with auxiliary speakers. The input of the speaker circuitry is adjusted according to the desired use. In a third mode, the speaker is deactivated entirely. Automatic switching between modes avoids having to manually reconfigure the mode of speaker operation when activating or deactivating an auxiliary speaker system. The speaker can be integrated with the computer enclosure. For example, a separate speaker enclosure can be designed to occupy some portion of space internal to a computer enclosure at least some of which would otherwise have been merely empty space.

10 Claims, 2 Drawing Sheets

METHOD AND APPARATUS FOR A SPEAKER FOR A PERSONAL COMPUTER FOR SELECTIVE USE AS A CONVENTIONAL SPEAKER OR AS A SUB-WOOFER

FIELD OF THE INVENTION

This invention relates to the field of speakers for use with personal computers, and to the field of sub-woofer speakers.

BACKGROUND OF THE INVENTION

Virtually all personal computers include a speaker for providing output. The default speaker is typically inexpensive and intended only for basic output with no expectation on the part of the manufacturer or the user that this speaker will have very high fidelity. In fact, virtually all computers sold today use very inexpensive speakers, typically positioned for convenience of the product designer to fit into an already-crowded environment of the computer enclosure with little or no ability to provide a favorable audio environment for the speaker itself. This is dictated in large part by cost concerns, space concerns and resource restraints, since the expected functionality of this speaker is only to provide low-fidelity output.

Such a speaker is typically used to provide audio feedback, for instance, to indicate that the computer has been turned on, or to provide various alert sounds, for example, when the computer needs to attract the user's attention to inform the user that some command has successfully executed, or perhaps that a command cannot execute (printer is out of paper, no printer selected, incorrect page format selected, and many other events).

Particularly with the recent trend to include a CD player in a computer and with increased use of computers for audio playback of CDs or games, there are a large number of extension speakers that can be connected to a computer. Typical speakers can be positioned near or are incorporated into the computer monitor to deliver higher quality sound directly to the user. In general, many of these speakers are designed using many of the techniques well known to speaker designers, such as porting, tuned enclosures, and the like.

Because of the quality difference of these speakers and the standard computer speaker, the standard speaker is typically disabled when an extension speaker is plugged in. This is particularly true when headphones are connected to the speaker since there is an expectation that the user seeks to direct any audio output from the computer solely to the user.

In previous designs, when the user added a set of external speakers to their computer, a simple mechanical switch arrangement shut off the internal speaker(s) of the computer. Referring to FIG. 1, a typical modern computer audio circuit consists of two identical headphone amplifiers A1 11 and A2 12, a summing amplifier A3 18 that converts the stereo signal from A1 and A2 into a single monophonic signal, a loudspeaker amplifier A4 22, a loudspeaker 23, a headphone output jack (J1) 16, and a comparator (CMP1) 19 used to detect the presence of a headphone plug (not shown) at J1 16.

The computer's (10) two audio signals (left 10L and right 10R) are fed to a pair of headphone amplifiers, A1 11 and A2 12, which can typically drive 32Ω loads. Blocking capacitors C1 24 and C2 25 are used to remove DC voltage that exists on A1 11 and A2 12 from reaching the headphones (not shown), which are plugged into audio jack J1 16. Resistors R1 13 and R2 14 provide a light load to ground to establish a ground potential at J116, thereby defining the voltages on either side of C1 24 and C2 25. R1 13 and R2 14 attenuate "pop" through the headphones whenever a headphone plug is first inserted into J1 16.

The AC-signal from A1 11 (and, correspondingly, A2 12) is voltage limited, and is typically less than 4V peak-to-peak. Due to the blocking action of C1 24 and the pulldown effect of R1 13, the AC signal at the intersection of R1/C1 13/24 will always be less than ±2V peak to peak.

Comparator CMP1 19 is connected to the normally-closed contact SW1 17, and has a high-value pullup resistor, R3 15, to Vcc (typically +5V). CMP1's switching threshold is at least 2.5V. R3's value preferably is at least ten times that of R1 13. Therefore, whenever no plug is present at J1 16, the output of CMP1 19, called "Plug_Detect" 20, will remain low because its input remains below its switching threshold, regardless of the AC input signal that CMP1 19 receives.

When an audio plug is inserted in J1 16, normally-closed contact SW1 17 is forced to open. Pullup resistor R3 15 then pulls Plug_Detect 20 up to Vcc. Plug_Detect 20 is now removed from the AC audio signal, and also pulled up to Vcc, so the output 21 of comparator CMP1 19 now switches to a high state. CMP1's output is then used to disable loudspeaker amplifier A4 22 whenever a plug is inserted in the audio output jack, J1 16.

Thus, in the present embodiment of the design, whenever a plug is inserted into the sound output port of a computer, the internal loudspeaker of the computer system is turned off.

Turning to the design of an internal speaker itself, it would be advantageous to provide a speaker with good bass response, and particularly advantageous to provide a sub-woofer for use with a computer system.

Sound engineers understand that reproducing low-frequency sound requires a relatively large enclosure. Design efforts to date have not succeeded in reproducing satisfactory low frequency sound using a small enclosure. Sound engineers continue to seek ways to make a sound reproducing system as compact as possible, yet still provide satisfactory bass response.

Psychoacoustic studies have determined that the human ear is incapable of locating sounds below approximately 200 Hz. That is, an average person can easily hear such sounds, but cannot pinpoint the sound source's location. This means that it is not necessary to have two large speakers to reproduce stereophonic low-frequency sound. In one preferred form, a single "subwoofer" module mixes the stereo signal into a single monophonic signal, while two (or more) smaller "satellite" speakers are used to reproduce mid- to high-frequency stereo sounds. This technique results in a small-appearing sound system consisting of small satellites, while the much larger subwoofer module is conveniently placed out of eye's view. The user's perception is that the tiny satellites "somehow" reproduce very low frequency sound, since the hidden subwoofer is providing the low frequency response.

Many different design techniques are used in the design of a subwoofer enclosure. While some use elaborate baffling in the construction of the sound enclosure, others use a much simpler technique called "porting." In this type of construction, which is incorporated in a preferred embodiment of this invention, an otherwise airtight box has two holes, one for the loudspeaker and another for a "port." A port is simply a tube that is inserted into the port opening. The volume of air contained in the box interacts with the loudspeaker and the air in the port tube. By proper tuning of the port tube length and diameter, low frequency performance of the loudspeaker enclosure is enhanced.

Up until now, all built-in computer sound systems simply mount a loudspeaker to the chassis, without minimal, if any, speaker enclosure, resulting in poor low-frequency sound. Only careful design of a complete loudspeaker system will provide good low-frequency sound reproduction. What is needed is a high quality audio output system for use with a personal computer.

SUMMARY OF THE INVENTION

The present invention provides a high quality speaker for use with a personal computer. The speaker is used in two modes, first as a conventional, multi-function speaker for conventional computer audio output and second as a subwoofer for use in combination with auxiliary speakers. The input of the speaker circuitry is adjusted according to the desired use. In a third mode, the speaker is deactivated entirely. It is preferable to provide some sort of automatic switching between modes so a user does not have to manually reconfigure the mode of speaker operation when activating or deactivating an auxiliary speaker system.

In a preferred embodiment, the speaker is integrated with the computer enclosure. In one preferred embodiment, a separate speaker enclosure is designed to occupy some portion of space internal to a computer enclosure at least some of which would otherwise have been merely empty space. Taken to an extreme, it may be appropriate in some instances to use a significant portion of the internal space, even all of it, although the audio requirements and the computer engineering requirements such as cooling of parts and thermal management will in general preclude using the entire internal enclosure space for a speaker enclosure.

In a preferred embodiment, the speaker is designed to efficiently output a full range sound signal or a low frequency sound. Thus the speaker should provide not only low bass response, but be capable of providing good midrange and some high range frequency response as well. In one particularly preferred embodiment, a high-quality ported loudspeaker enclosure is used. A ported loudspeaker design is capable of reproducing full-range sounds, especially low frequencies. If the speaker and enclosure are sufficiently large, low-frequency sound quality is sufficient to qualify as a subwoofer.

It is one object of the invention to provide a speaker which functions well as a full range, conventional, primary speaker for a computer system but which can be used in an alternate mode to provide an effective sub-woofer.

This and other objects and advantages of the invention, as well as the details of an illustrative embodiment, will be more fully understood from the following specification and drawings.

DESCRIPTION OF THE PREFERRED EMBODIMENTS

Figure 1:
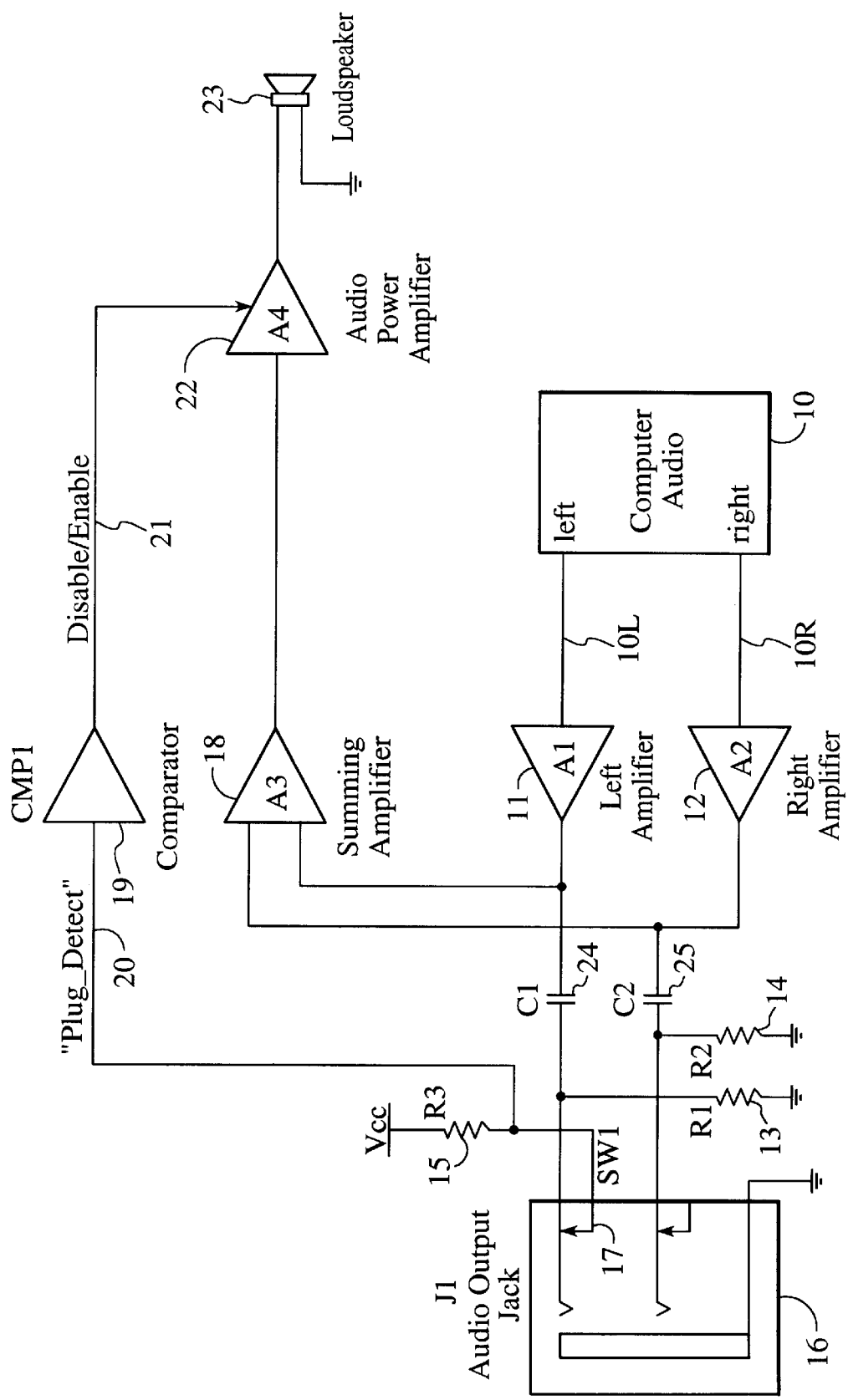
FIG. 1 illustrates a conventional computer audio output circuit.

The design of the Performa 6400 Tower enclosure allowed Apple to incorporate a small subwoofer, but also adds a slight twist to the equation. Every Macintosh must be capable of playing sound, usually "full-range" sound. Apple computers are, for the most part, designed to deliver 16 bit, stereo sound, but are sold with only a single speaker in the computer enclosure itself. Those users who choose not to take advantage of the built-in stereo sound still need the ability to reproduce various boot beeps, alerts, etc. A single built-in, full-range speaker will do the trick.

It is possible, and now deemed desirable, to provide a very high quality monophonic speaker contained in the computer enclosure, a speaker capable of reproducing lower bass frequency than many external speaker sets. In this situation, it is advantageous to use the internal high quality speaker as a "subwoofer", while allowing the external speakers to behave as "satellite" speakers.

Thus, the internal loudspeaker in the tower enclosure does double-duty: it can either act as a monophonic full-range loudspeaker for stand alone operations, or it can function as a "subwoofer," passing only frequencies below a selected cutoff frequency, selected as 200 Hertz in one preferred embodiment. This new mode requires that this new internal speaker never shut off, and that it change modes depending on the application (stand alone or "satellite" mode).

How and when to change modes is a simple extension of the way things already are in the computer world. Presently, whenever a plug is inserted into the sound output port of a computer (i.e., the computer detects that something is plugged into its sound output port), then the computer shuts off its internal speaker. In other words, the means of detecting whenever anything is plugged into the sound output port is already there. What is new is to change the meaning of the plug detection. Rather then shut the speaker off when a plug is inserted into the sound output jack, it is preferable to change modes from "full-range" (stand alone) to "low-pass" (satellite/subwoofer) sound output.

In a typical user installation, external loudspeakers are treated as satellites. In general, these external speakers will be placed quite close to the user, typically within two or three feet of their ears. This makes an ideal application of the satellite/subwoofer concept.

There will be times when it is still desired to shut off the computer's internal speaker. A user connecting a very high quality sound system to his or her computer, or a when using headphones, may want the option of disabling the internal loudspeaker. In one preferred embodiment, that control is now handled by the computer itself: a software control panel gives the user the needed flexibility. It may be appropriate for certain applications to disable the internal speaker. As just one example, an audio test program may selectively disable the internal speaker. It might be appropriate for, say, a communications program providing a speaker telephone function, to disable the internal speaker.

Figure 2:
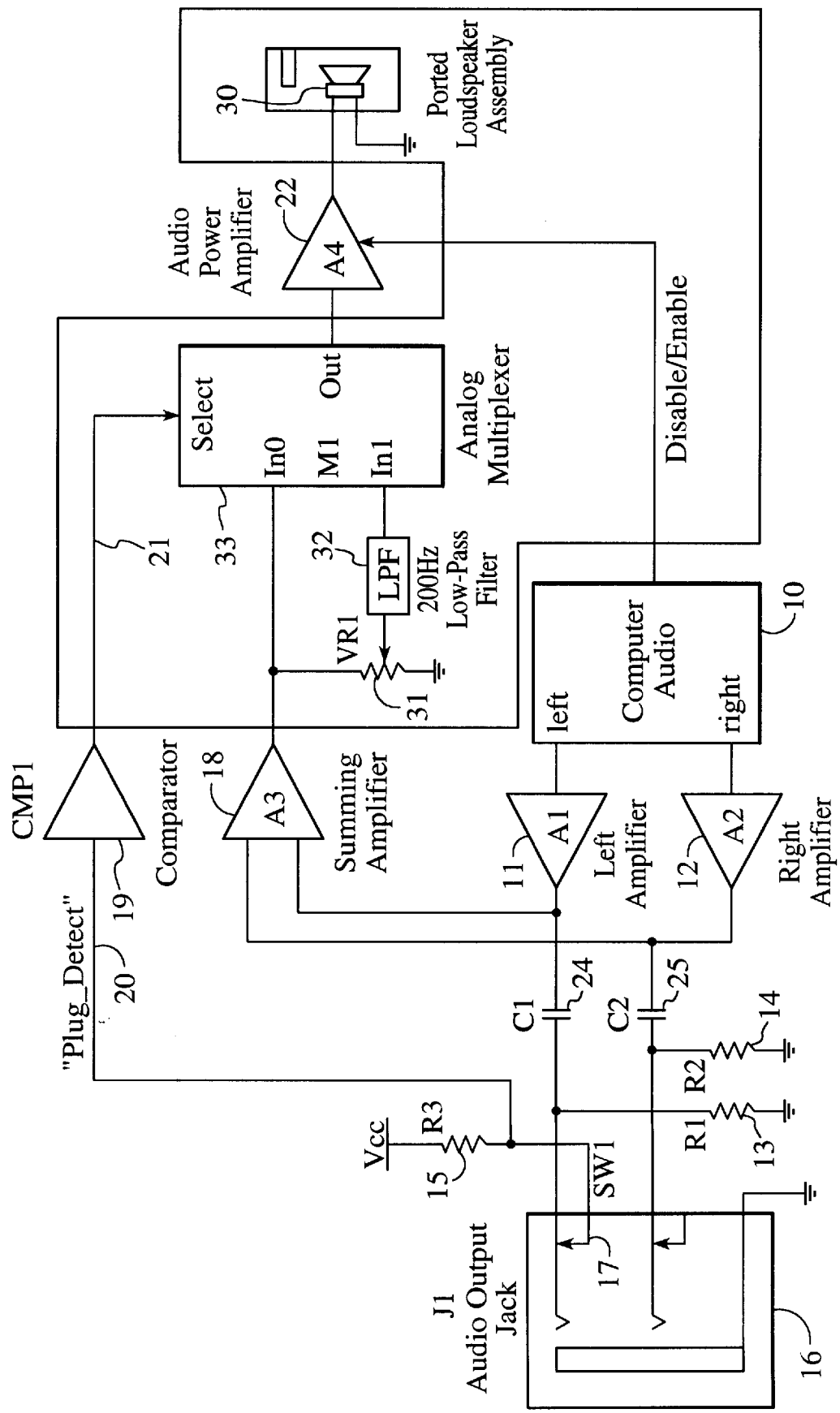
FIG. 2 illustrates a computer audio output circuit according to this invention.

One preferred embodiment of this new invention is illustrated in FIG. 2.

In addition to the circuitry noted in FIG. 1, the preferred embodiment includes a variable resistor, VR1 31, a low-pass filter, LPF 32, and an analog multiplexer 33. In addition, a signal from the computer can be used to enable and disable the loudspeaker amplifier.

Summing amplifier A3 18 connects to one input of analog multiplexer, M1 33. This multiplexer can preferably be a 2:1 analog multiplexer. Summing amplifier A3 18 also is connected to the "hot" end of variable resistor VR1 31. The variable tap of VR1 31 feeds the input of a low-pass filter, LPF 32. LPF 32 is designed to attenuate frequencies above approximately 200 Hz. As implemented in this design, it also has a gain of 2.

The low-pass filter output feeds the other input of analog multiplexer M1 33. Thus, the output 34 of M1 33 will either be a full-range monophonic signal ("In0") or a filtered and attenuated version of the same signal ("In1"), depending on the state of the Select bit of M1 33. M1's analog output 34 drives the loudspeaker amplifier 22, and therefore the loudspeaker 30.

Whereas previous designs used the signal called Plug_ Detect 20 to switch the loudspeaker on and off, this design uses that signal to switch between full-range and subwoofer modes. The output of comparator CMP1 19 drives analog multiplexer M1's Select bit. Therefore, the state of jack J1 16 (i.e., plug inserted or not inserted) will determine the frequency band of signals applied to the loudspeaker. The polarity of logic is such that when no plug is inserted in J1 16, the loudspeaker 30 plays full-range monophonic sound. But when a plug is inserted into J1 16, the loudspeaker 30 plays only low-pass filtered signal with a level determined by variable resistor VR1 31. VR1 31 is adjusted so that the sound coming from the loudspeaker 30 during the subwoofer mode is "balanced" with that of the external loudspeakers (which receive their signal from J1 16). VR1 31 has no affect on the sound volume when there is no plug inserted in J1 16.

Sound that has been filtered to a bandwidth of less than 200 Hz and played through a loudspeaker capable of reproducing low-frequency sounds successfully mimics the sound produced by a true subwoofer.

A general description of the device and method of using the present invention as well as a preferred embodiment of the present invention has been set forth above. One skilled in the art will recognize and be able to practice many changes in many aspects of the device and method described above, including variations which fall within the teachings of this invention. The spirit and scope of the invention should be limited only as set forth in the claims which follow.

What is claimed is:

1. A computer system having multiple speaker modes, the computer system capable of being coupled to an external speaker, the computer system comprising:

a microprocessor;

a default speaker for providing an audio output, the default speaker being capable of providing good low frequency response as well as reasonable mid- and high-frequency response;

a speaker input with at least two modes, a first mode for providing a wide frequency response over the default speaker and a second mode for providing a low frequency response over the default speaker, the input for selecting which of the at least two modes is selected for the default speaker; and an output jack coupled to the speaker input and capable of being connected to the external speaker;

wherein the speaker input further selects the first mode or the second mode in response to a signal indicating whether the output jack is used to couple the external speaker to the computer system; and wherein when the second mode is selected, the default speaker provides the low frequency response, the external speaker provides a higher frequency response, and the computer system is capable of providing sound over the default speaker and the external speaker.

2. The system of claim 1 wherein the speaker input further comprises a multiplexer.

3. The system of claim 2 wherein the speaker input further selects the first mode when the output jack is not in use.

4. The system of claim 3 wherein the speaker input further selects the second mode when the output jack is in use.

5. The system of claim 4 further comprising:

means coupled to the default speaker for disabling the default speaker;

wherein the external speaker carries substantially all frequencies when the default speaker is disabled.

6. A method of providing a selected speaker mode in a computer system capable of being coupled with an external speaker, the method comprising the steps of:

providing a microprocessor;

providing a default speaker for providing an audio output having an output frequency range, the default speaker being capable of operating in at least two modes, a first mode with a wide frequency response and a second mode with a low frequency response;

providing an output jack coupled to the speaker input and capable of being connected to the external speaker;

detecting an input which is appropriate for one mode but not the other; and selecting the corresponding mode according to the input, wherein the first mode or the second mode is selected in response to a signal indicating whether the output jack is used to couple the external speaker to the computer system; and wherein when the second mode is selected, the default speaker provides the low frequency response, the external speaker provides a higher frequency response, and the computer system is capable of providing sound over the default speaker and the external speaker.

7. The method of claim 6 wherein the step of providing the speaker input further comprises the step of:

providing a multiplexer.

8. The method of claim 7 wherein the speaker input further selects the first mode when the output jack is not in use.

9. The method of claim 8 wherein the speaker input further selects the second mode when the output jack is in use.

10. The method of claim 9 further comprising the step of:

providing means coupled to the default speaker for disabling the default speaker;

wherein the external speaker carries substantially all of the frequencies when the default speaker is disabled.

\* \* \* \* \*